(12) United States Patent
Chang et al.

(10) Patent No.: US 7,926,727 B2
(45) Date of Patent: Apr. 19, 2011

(54) RFID TAGS, RFID ELECTRONIC DEVICES AND RELATED METHODS FOR ANTI-THEFT AND DATA TRANSMISSION PURPOSES

(75) Inventors: Wei Chang, Hsinchu (TW); Heng-Chih Lin, Hsinchu (TW); Henry Tin-Hang Yung, Hsin-Chu County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1080 days.

(21) Appl. No.: 11/616,022

(22) Filed: Dec. 26, 2006

(65) Prior Publication Data

US 2008/0093463 A1   Apr. 24, 2008

(30) Foreign Application Priority Data

Oct. 18, 2006   (TW) ............................... 95138366 A

(51) Int. Cl.
*G06K 19/06* (2006.01)
(52) U.S. Cl. ........ 235/492; 235/375; 235/383; 235/435; 455/73; 455/557; 455/558; 340/10.1; 340/572.1
(58) Field of Classification Search .................. 235/492, 235/375, 383, 435; 455/73, 557, 558; 340/10.1, 340/572.1
See application file for complete search history.

(56) References Cited

U.S. PATENT DOCUMENTS

| | | | |
|---|---|---|---|
| 5,525,994 A * | 6/1996 | Hurta et al. | 342/51 |
| 6,317,028 B1 | 11/2001 | Valiulis | |
| 6,720,866 B1 * | 4/2004 | Sorrells et al. | 340/10.4 |
| 7,616,117 B2 * | 11/2009 | Streeb et al. | 340/572.1 |
| 2003/0124976 A1 * | 7/2003 | Tamaki et al. | 455/15 |
| 2005/0240498 A1 | 10/2005 | Thaler | |
| 2006/0223453 A1 * | 10/2006 | Griffin et al. | 455/73 |
| 2007/0075139 A1 * | 4/2007 | Hammond et al. | 235/435 |
| 2007/0117392 A1 * | 5/2007 | Smith et al. | 438/689 |
| 2007/0143853 A1 * | 6/2007 | Tsukamoto | 726/26 |

FOREIGN PATENT DOCUMENTS

| | | |
|---|---|---|
| CN | 1302381 A | 7/2001 |
| CN | 2535868 Y | 2/2003 |
| TW | 415607 | 12/2000 |
| TW | 494245 | 7/2002 |
| WO | 0058752 A1 | 10/2000 |

* cited by examiner

*Primary Examiner* — Allyson N Trail
(74) *Attorney, Agent, or Firm* — Winston Hsu; Scott Margo

(57) ABSTRACT

An RFID tag is integrated with a processor of an electronic product for anti-theft purpose. The RFID tag receives an enable mark when the electronic product is checked out at a point of sale. Only when the processor receives the enable mark from the RFID tag can the start-up sequence of the electronic product be executed. An RFID tag is integrated with a sensor of an electronic product for data transmission purpose. Data measured by the sensor can be stored in the memory of the RFID tag and outputted via the antenna of the RFID tag.

18 Claims, 5 Drawing Sheets

RFID TAGS, RFID ELECTRONIC DEVICES AND RELATED METHODS FOR ANTI-THEFT AND DATA TRANSMISSION PURPOSES

BACKGROUND OF THE INVENTION

1. Field of the Invention

The present invention relates to an RFID tag and related operating methods, and more particularly, to an RFID integrated with an electronic device and related methods for anti-theft and data transmission purposes.

2. Description of the Prior Art

Radio frequency identification (RFID) techniques provide a non-contact automatic identification system capable of transmitting radio frequency (RF) signals between a reader and a tag in a wireless manner for object identification or data transmission purposes. RFID systems, characterized in wireless and bi-directional data transmission, long lifetime, high safety and high endurance, are particularly suitable for applications in automatic systems or harsh environments, such as in warehouse management, burglarproof security systems for automobiles, livestock identification, automatic charge systems, or quality control, etc.

An RFID system usually includes an RFID tag, a reader and a computer system. The RFID tag, having a chip and an antenna assembled using special packaging techniques, can store data and conduct data transmission with the RFID reader. The RFID tag usually includes an unique identifier (UID) and a memory space for data storage. For accurate data transmission, the RFID tag and the RFID reader have to communicate based on agreed-upon protocols, such as the communication frequency, the modulation type, the transmission speed or the transmission command. Therefore, when the RFID tag is located within the operational range of the RFID reader, the RFID reader can access the data stored in the RFID tag.

RFID tags can be categorized into active RFID tags and passive RFID tags. An active RFID tag, including a built-in battery, can automatically transmit data to an RFID reader using self-provided power and can perform internal system control using the built-in battery. As a result, active RFID tags are advantageous in longer effective sensing ranges, but disadvantageous in a shorter lifetime, larger sizes and higher costs. A passive RFID tag, without a built-in battery, receives RF signals from an RFID reader, transforms the RF signals into power for operating the passive RFID tag using an internal circuit, and then transmits data to the RFID reader. As a result, passive RFID tags are disadvantageous in shorter effective sensing ranges, but advantageous in a longer lifetime, smaller sizes and lower costs. Passive RFID tags are mainly used in short-distance applications, such as in entrance or traffic controls.

Reference is made to FIG. 1 for a functional block diagram illustrating a prior art RFID system 100. The RFID system 100 includes a passive RFID tag circuit 10 and an RFID reader 11. The RFID tag circuit 10 includes a rectifier 12, a power management module 13, a demodulator 14, a modulator 15, an oscillator 16, a digital baseband circuit 17, and a memory 18.

The RFID reader 11 outputs an RF signal $S_{RF}$ of a predetermined frequency using its antenna. When the RFID tag circuit 10 is located within the operational range of the antenna, the RFID tag circuit 10 can receive the RF signal $S_{RF}$ using its antenna. The rectifier 12 transforms the RF signal $S_{RF}$ into a directive current (DC) voltage VDD_REC and outputs the DC voltage VDD_REC to the power management module 13. The power management module 13, which can include a regulator, generates a corresponding DC voltage VDD for operating each device in the RFID tag circuit 10 stably. By demodulating the RF signal $S_{RF}$, the demodulator 14 generates a corresponding demodulation signal $S_{DEM}$ for subsequent data processing. The oscillator 16 generates a clock signal $S_{CLK}$ for operating the digital baseband circuit 17. The demodulation signal $S_{DEM}$ includes address information of the data to be accessed by the RFID reader 11. Therefore, the digital baseband circuit 17 can access the data stored in the memory 18 based on the clock signal $S_{CLK}$ and the demodulation signal $S_{DEM}$, and then outputs a corresponding data signal $S_{DATA}$. The modulator 15 can modulate the data signal $S_{DATA}$ based on back scatter modulation so that data can be transmitted more effectively. In back scatter modulation, the modulator 15 adjusts its input impedance using the continuous carrier waves sent by the RFID reader 11, and the phases of the carrier waves reflected by the antenna of the RFID tag circuit 10 can thus be adjusted. Back scatter modulation provides the effects similar to phase-shift-keying (PSK) in which an RF signal $S_{RF}'$ corresponding to the data signal $S_{DATA}$ can be generated and transmitted to the RFID reader 11 via the antenna of the RFID system 100.

SUMMARY OF THE INVENTION

The present invention provides an electronic device having an RFID tag comprising an RFID tag circuit and an integrated circuit. The RFID tag circuit includes an I/O interface; a memory for storing data; a first path-controlling circuit for receiving a first signal via the I/O interface, receiving a second signal in a wireless manner, and outputting one of the first and second signals; a baseband circuit coupled to the first path-controlling circuit and the memory for processing signals outputted by the first path-controlling circuit, accessing data stored in the memory, and outputting an output signal; and a second path-controlling circuit coupled to the baseband circuit for outputting signals outputted by the baseband circuit via the I/O interface or in a wireless manner. The integrated circuit is coupled to the I/O interface for transmitting signals with the RFID tag circuit.

The present invention also provides an RFID tag comprising an I/O interface; a memory for storing data; a first path-controlling circuit for receiving a first signal via the I/O interface, receiving a second signal in a wireless manner, and outputting one of the first and second signals; a baseband circuit coupled to the first path-controlling circuit and the memory for processing signals outputted by the first path-controlling circuit, accessing data stored in the memory, and outputting an output signal; and a second path-controlling circuit coupled to the baseband circuit for outputting signals outputted by the baseband circuit via the I/O interface or in a wireless manner.

The present invention also provides an anti-theft method using RFID tags comprising integrating an RFID tag with a processor of an electronic device; writing an enable mark into a memory of the RFID tag; the processor confirming whether the memory of the RFID tag includes the enable mark during a start-up sequence; and the processor enabling the electronic device after accessing the enable mark.

The present invention also provides a method for transmitting data using RFID tags comprising integrating an RFID tag with a sensing device; writing data measured by the sensing device into a memory of the RFID tag; and outputting data stored in the memory of the RFID tag via an antenna of the RFID tag.

These and other objectives of the present invention will no doubt become obvious to those of ordinary skill in the art after

DETAILED DESCRIPTION

Figure 1:
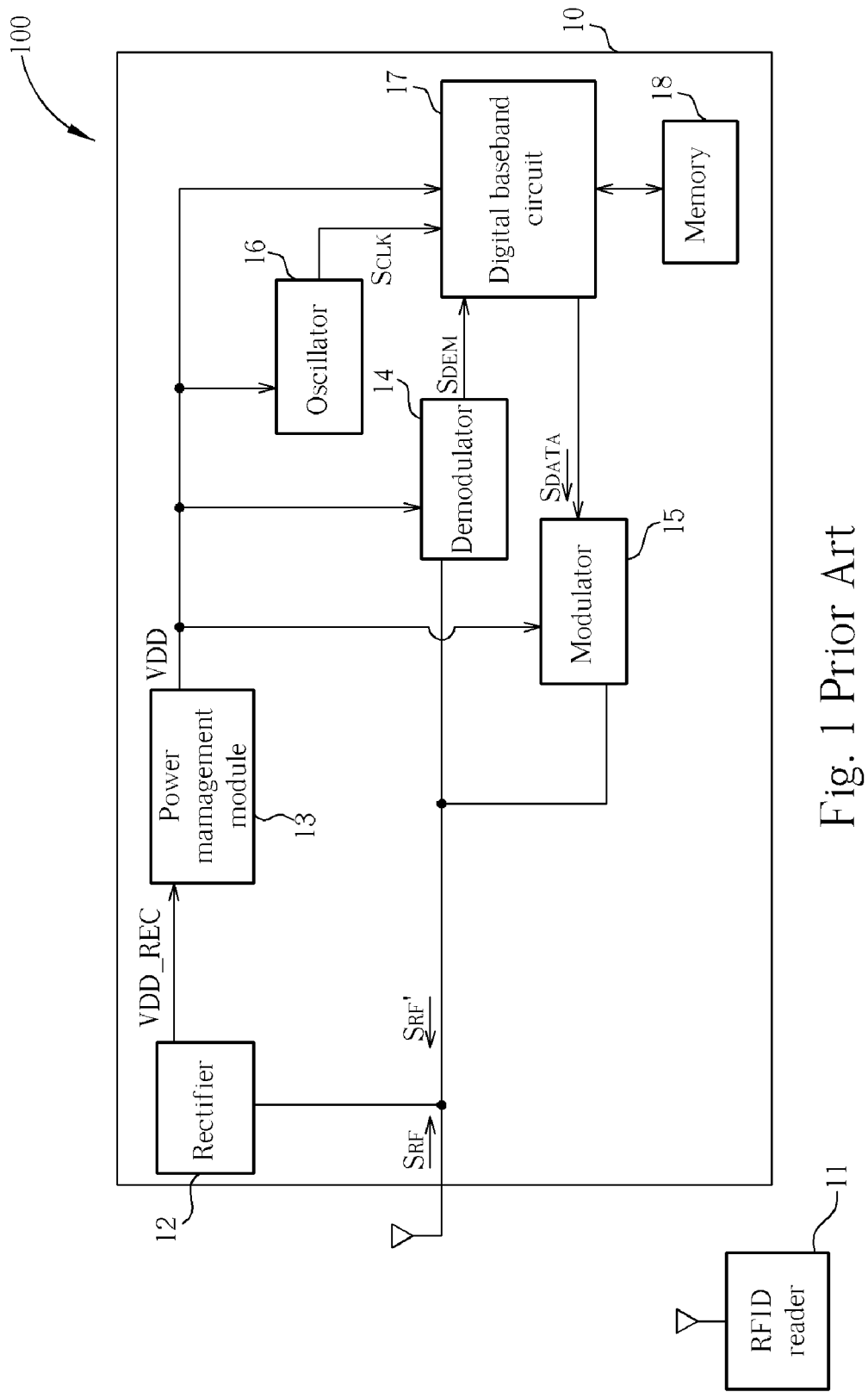
FIG. 1 is a functional block diagram illustrating a prior art RFID system.
Figure 2:
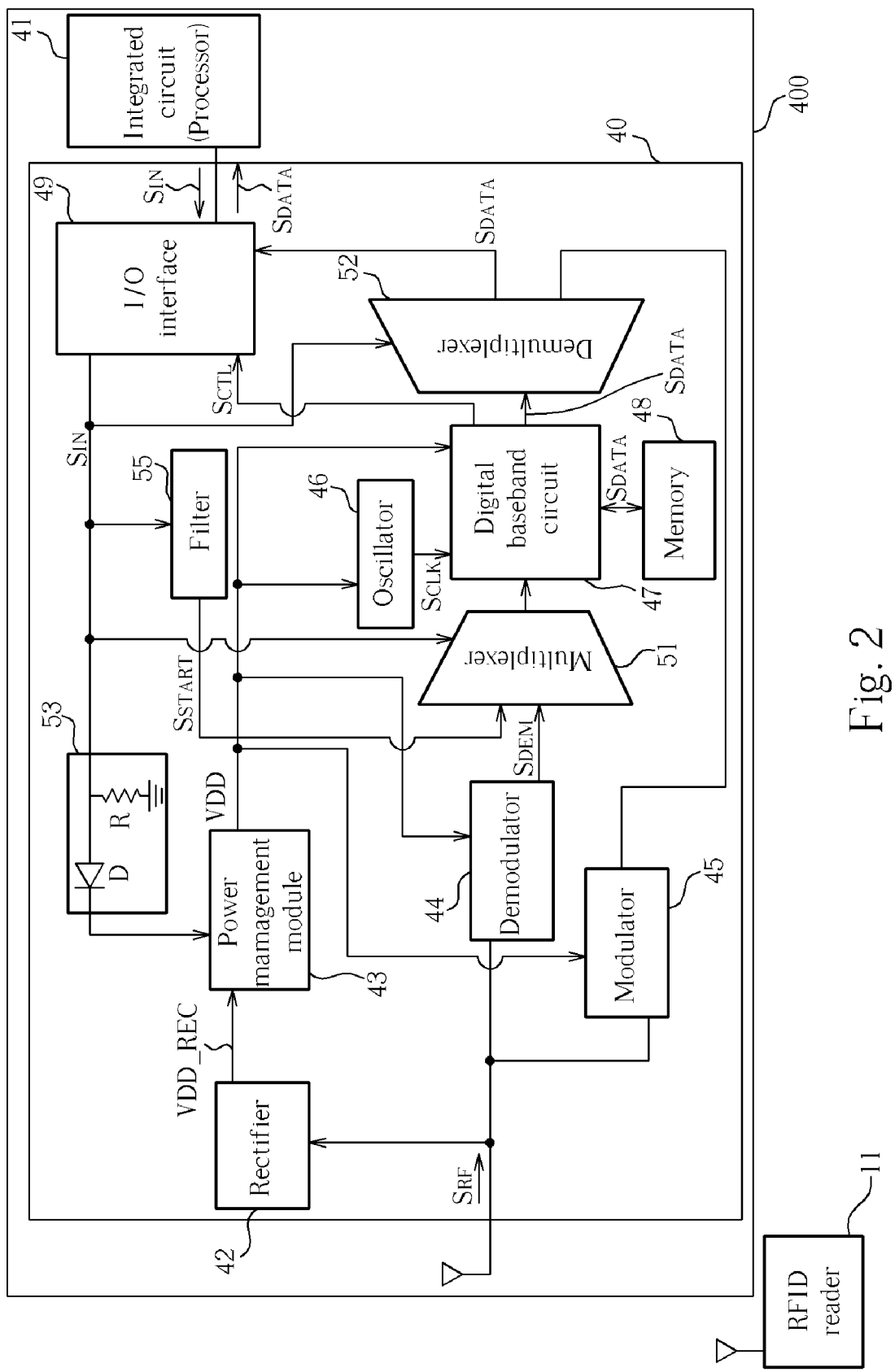
FIG. 2 is a detailed functional block diagram illustrating an RFID device according to a first embodiment of the present invention.

Reference is made to FIG. 2 for a detailed functional block diagram illustrating an RFID device 400 according to a first embodiment of the present invention. The RFID device 400 includes an RFID tag circuit 40 and an integrated circuit 41. In the first embodiment of the present invention, the integrated circuit 41 of the RFID device 400 is a processor for controlling the operation of the RFID device 400. The RFID tag circuit 40 of the RFID device 400 includes a rectifier 42, a power management module 43, a demodulator 44, a modulator 45, an oscillator 46, a digital baseband circuit 47, a memory 48, an input/output (I/O) interface 49, a multiplexer 51, a demultiplexer 52, a detecting circuit 53 and a filter 55. The RFID tag circuit 40 can receive a signal $S_{IN}$ transmitted from the integrated circuit 41 and an RF signal $S_{RF}$ transmitted from the RFID reader 11 in a wireless manner. The multiplexer 51, having a 2-to-1 structure, receives two input signals and outputs one of the two input signals. The demultiplexer 52, having a 1-to-2 structure, receives an input signal and output the input signal via the I/O interface 49 or in a wireless manner. The I/O interface 49 receives signal $S_{IN}$ from the integrated circuit 41. The signal $S_{IN}$ can control outputs of the multiplexer 51 and the demultiplexer 52. The I/O interface 49 controls a signal transmission path between the RFID tag circuit 40 and the integrated circuit (processor) 41 based on a control signal $S_{CTL}$. When the control signal $S_{CTL}$ has a high logic level, the I/O interface 49 operates in an output mode in which data is transmitted from the I/O interface 49 to the integrated circuit (processor) 41; when the control signal $S_{CTL}$ has a low logic level, the I/O interface 49 operates in an input mode in which data is transmitted from the integrated circuit (processor) 41 to the I/O interface 49. The detecting circuit 53, coupled between the integrated circuit (processor) 41 and the power management module 43, can include a diode D and a resistor R. When electrically connected to the integrated circuit (processor) 41, the power management module 43 generates the DC voltage VDD for operating each device in the RFID tag circuit 40 based on the signal $S_{IN}$ transmitted from the integrated circuit 41. When electrically isolated from the integrated circuit (processor) 41, the power management module 43 generates the DC voltage VDD based on the RF signal $S_{RF}$ transmitted from the RFID reader 11.

Figure 3:
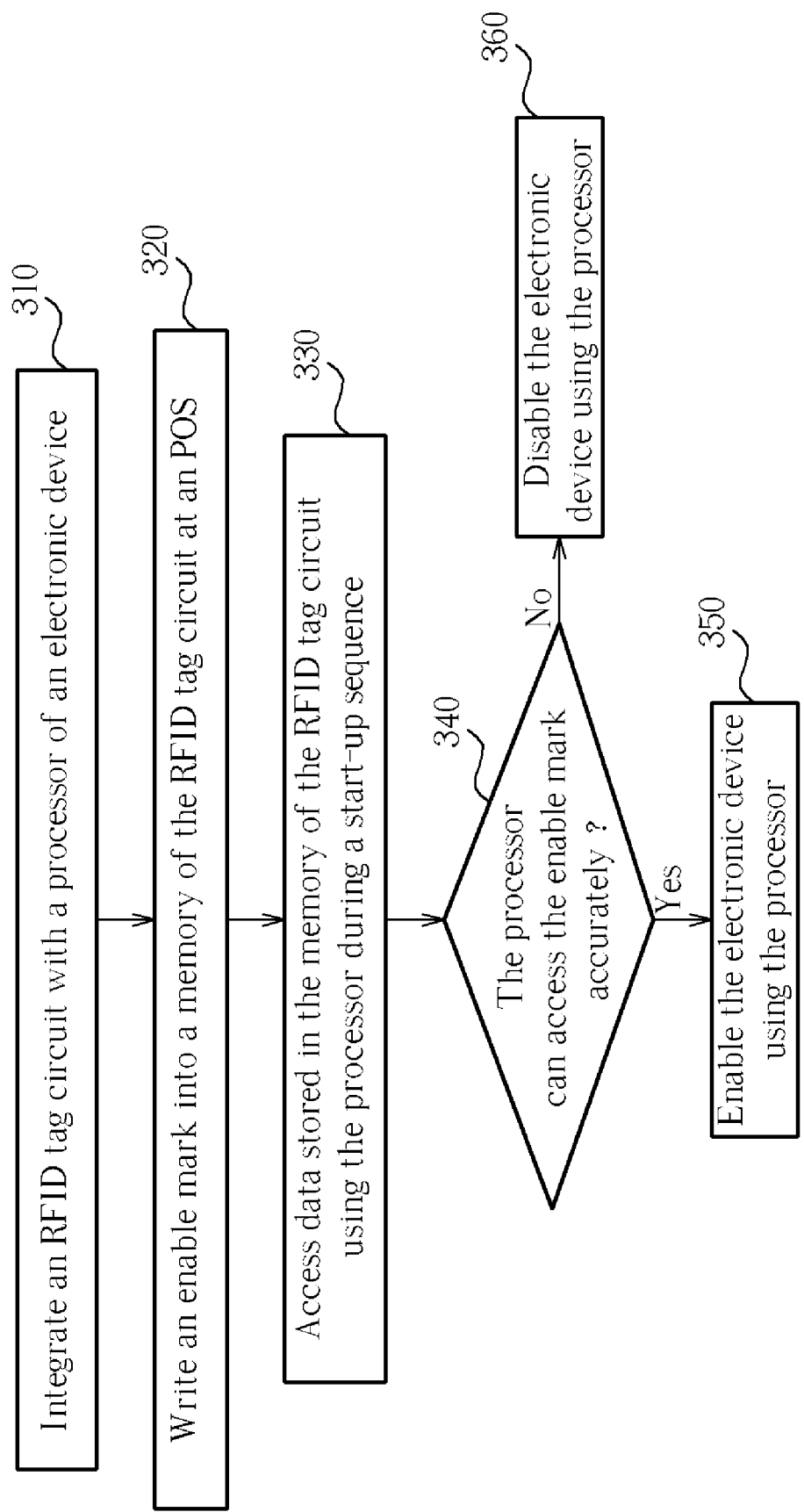
FIG. 3 is a flowchart illustrating an anti-theft method using the RFID device in FIG. 2 according the first embodiment of the invention.

Reference is made to FIG. 3 for a flowchart illustrating an anti-theft method using the RFID device 400 according the first embodiment of the invention. The flowchart in FIG. 3 includes the following steps:

Step 310: integrate an RFID tag circuit with a processor of an electronic device.

Step 320: write an enable mark into a memory of the RFID tag circuit at a point of sale (POS).

Step 330: access data stored in the memory of the RFID tag circuit using the processor during a start-up sequence.

Step 340: determine if the processor can access the enable mark accurately; if the processor can access the enable mark accurately, execute step 350; if the processor cannot access the enable mark accurately, execute step 360.

Step 350: enable the electronic device using the processor.

Step 360: disable the electronic device using the processor.

When the first embodiment of the present invention is used for anti-theft purposes, the RFID tag circuit 40 is integrated to the integrated circuit (processor) 41 of the RFID device 400. When a consumer pays for a product attached with the RFID device 400, the RFID reader 11 sends an RF signal $S_{RF}$ corresponding to an enable mark $S_{DATA}$ to the RFID tag circuit 40. The RFID tag circuit 40 then stores the enable mark $S_{DATA}$ into a specific address in the memory 48.

When the consumer turns on the power of the product, the integrated circuit (processor) 41 sends a signal $S_{IN}$ to the RFID tag circuit 40. The diode D of the detecting circuit 53 is conducting upon receiving the signal $S_{IN}$, thereby electrically connecting the integrated circuit (processor) 41 to the power management module 43. Under these circumstances, the RFID tag circuit 40 does not receive the RF signal $S_{RF}$ sent by the RFID reader 11 and the power management module 43 cannot receive the DC voltage VDD_REC. Instead, the power management module 43 generates the DC voltage VDD for operating each device in the RFID tag circuit 40 stably based on the signal $S_{IN}$ sent by the integrated circuit (processor) 41. The filter 55 receives and processes the signal $S_{IN}$ transmitted via the I/O interface 49, and outputs a corresponding start-up signal $S_{START}$ to the multiplexer 51. Under these circumstances, the start-up signal $S_{START}$ is transmitted to the digital baseband circuit 47 via the multiplexer 51. After accessing the enable mark $S_{DATA}$ stored in the memory 48 based on the start-up signal $S_{START}$, the digital baseband circuit 47 outputs the enable mark $S_{DATA}$ to the demultiplexer 52 and outputs the control signal $S_{CTL}$ having a high logic level to the I/O interface 49. The I/O interface 49 operating in the output mode can then transmit the enable mark $S_{DATA}$ to the integrated circuit (processor) 41. If the enable mark $S_{DATA}$ can be accessed successfully, the integrated circuit (processor) 41 continues with subsequent steps of the start-up sequence so that the product can function normally. If the enable mark $S_{DATA}$ cannot be accessed successfully, the integrated circuit (processor) 41 terminates the start-up sequence so that the product cannot function normally. As a result, if the product is not carried out via the POS, the RFID tag circuit 40 of the RFID device 400 cannot receive the enable mark $S_{DATA}$. Even if a thief steals the product successfully, the product cannot function normally, thereby lowering the motives for thievery.

Figure 4:
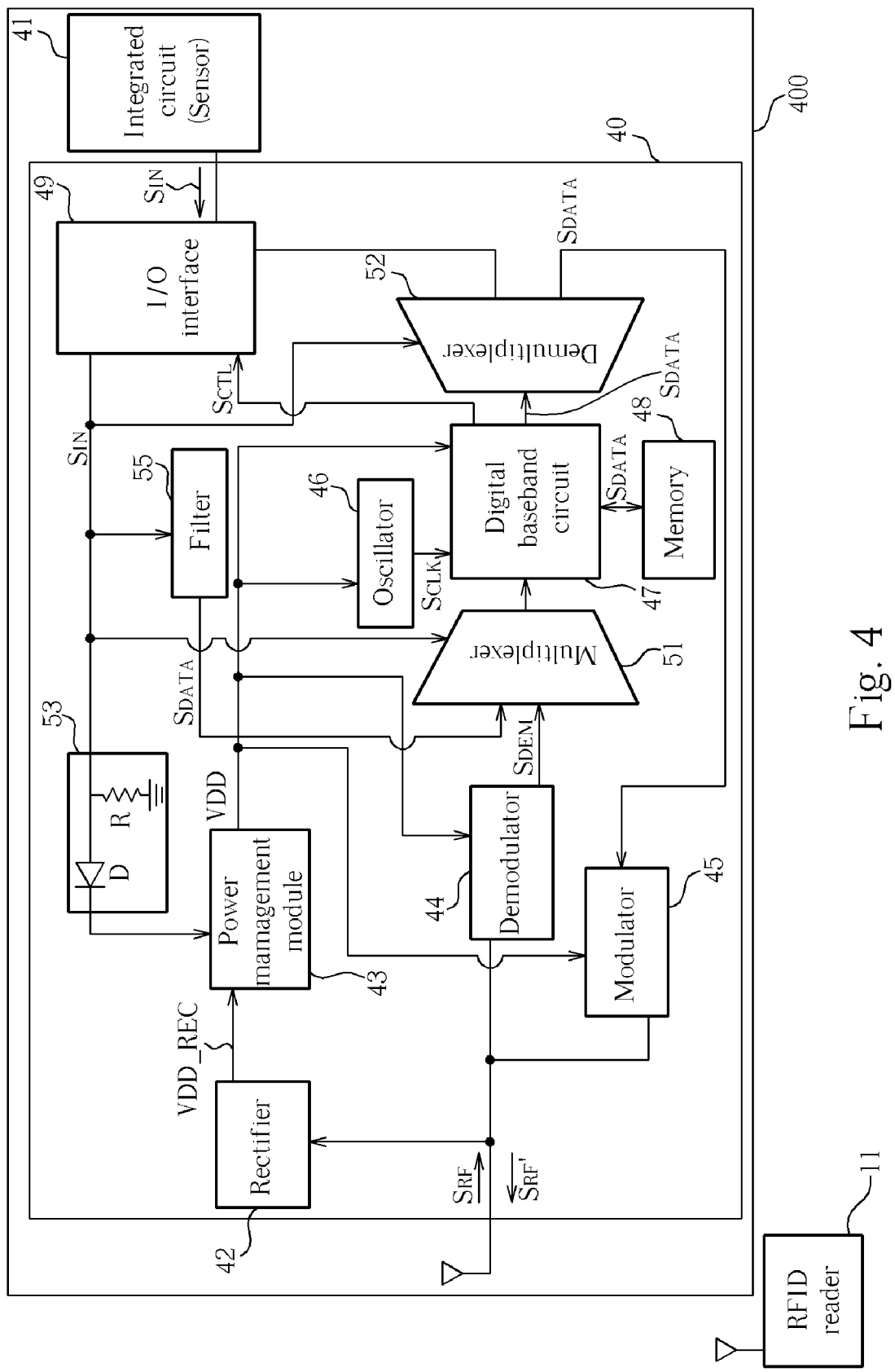
FIG. 4 is a detailed functional block diagram illustrating an RFID device according to a second embodiment of the present invention.

Reference is made to FIG. 4 for a detailed functional block diagram illustrating the RFID device 400 according to a second embodiment of the present invention. In the second embodiment of the present invention, the integrated circuit 41 of the RFID device 400 is a sensor capable of measuring various types of data.

Figure 5:
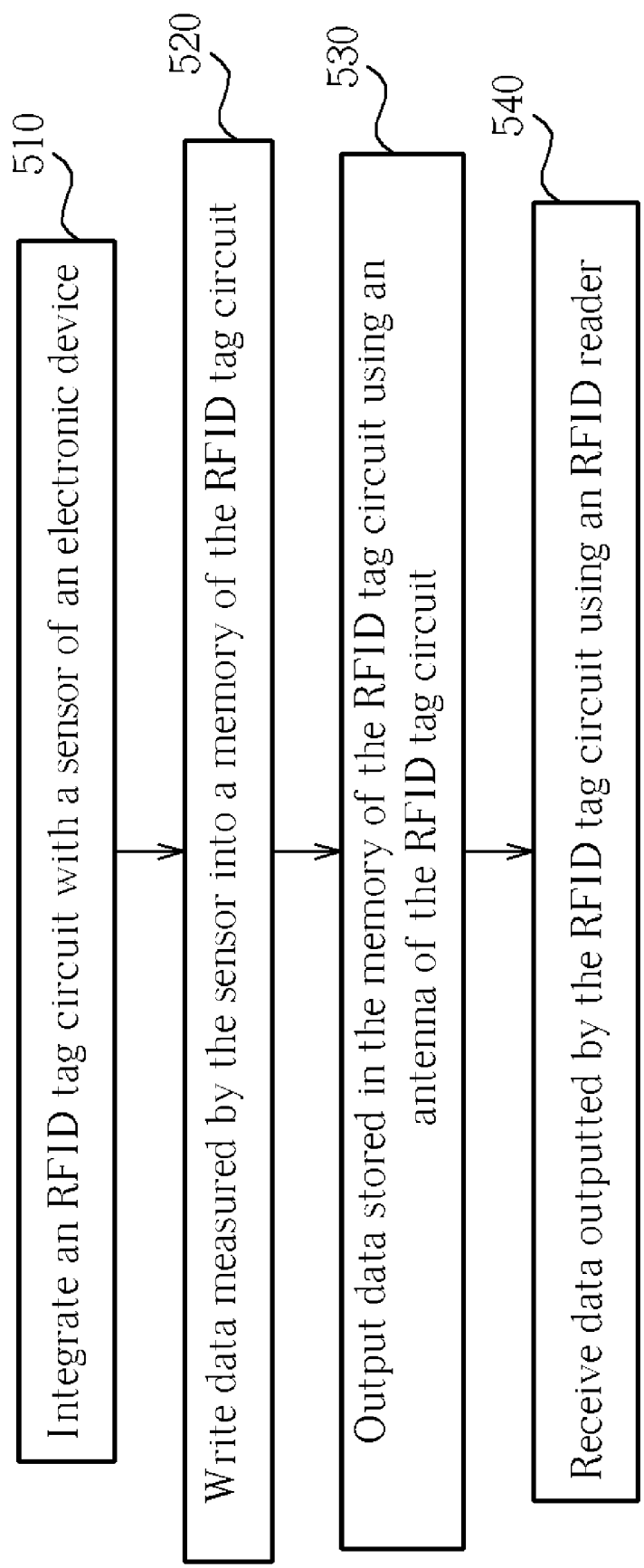
FIG. 5 is a flowchart illustrating a method for transmitting data using the RFID device in FIG. 4 according the second embodiment of the invention.

Reference is made to FIG. 5 for a flowchart illustrating a method for transmitting data using the RFID device 400 according the second embodiment of the invention. The flowchart in FIG. 5 includes the following steps:

Step 510: attach an RFID tag circuit to a sensor of an electronic device.

Step 520: write data measured by the sensor into a memory of the RFID tag circuit.

Step 530: output data stored in the memory of the RFID tag circuit using an antenna of the RFID tag circuit.

Step 540: receive data outputted by the RFID tag circuit using an RFID reader.

When the RFID device 400 is operating, the integrated circuit (sensor) 41 outputs a signal $S_{IN}$ corresponding to measured data. The diode D of the detecting circuit 53 is conducting upon receiving the signal $S_{IN}$, thereby electrically connecting the integrated circuit (sensor) 41 to the power management module 43. Under these circumstances, the RFID device 400 generates the DC voltage VDD for operating each device in the RFID tag circuit 40 stably based on the signal $S_{IN}$ sent by the integrated circuit (sensor) 41. The filter 55 receives and processes the signal $S_{IN}$ transmitted via the I/O interface 49, and outputs a data signal $S_{DATA}$ corresponding to the measured data. Under these circumstances, the data signal $S_{DATA}$ is transmitted to the digital baseband circuit 47 via the multiplexer 51. The digital baseband circuit 47 then stores the data signal $S_{DATA}$ in the memory 48.

A user can access the data measured by the integrated circuit (sensor) 41 by transmitting an RF signal $S_{RF}$ to the RFID tag circuit 40 using the RFID reader 11. By demodulating the RF signal $S_{RF}$, the demodulator 44 generates a corresponding demodulation signal $S_{DEM}$ for subsequent data processing. The oscillator 46 generates a clock signal $S_{CLK}$ for operating the digital baseband circuit 47. Under these circumstances, the demodulation signal $S_{DEM}$ is transmitted to the digital baseband circuit 47 via the multiplexer 51. Therefore, the digital baseband circuit 47 can access the data signal $S_{DATA}$ stored in the memory 48 based on the clock signal $S_{CLK}$ and the demodulation signal $S_{DEM}$. Next, the data signal $S_{DATA}$ is transmitted to the modulator 45 via the demultiplexer 52. The modulator 45 then generates an RF signal $S_{RF}'$ corresponding to the data signal $S_{DATA}$ by modulating the data signal $S_{DATA}$ so that data can be transmitted more effectively. The RF signal $S_{RF}'$ is transmitted to the RFID reader 11 in a wireless manner via the antenna of the RFID tag circuit 40. As a result, instead of accessing the data measured by the integrated circuit (sensor) 41 by connecting to the RFID device 400 in a wired manner, the user can receive the data outputted by the RFID tag circuit 40 using the RFID reader 11 in a wireless manner. Also, the user can control the integrated circuit (sensor) 41 by sending a control signal to the memory 48 of the RFID tag circuit 40.

In the above-mentioned embodiments, a passive RFID tag is used for illustrating the present invention. The power for operating the passive RFID tag can be provided by the RF signal of the RFID reader or by the power of the electronic product. However, the present invention can also be used in an active RFID tag in which the required power is provided by its internal battery.

In the apparatuses disclosed in the present invention, the electronic device communicate with its attached RFID tag based on the original protocol of the RFID tag circuit, and the RFID tag circuit can thus be simplified. The flowcharts in FIGS. 3 and 5 illustrate the present invention for anti-theft and data transmission purposes, but do not limit the scope of the present invention.

In the present invention, an RFID tag is integrated with an electronic device for anti-theft and data transmission purposes. In anti-theft applications, the RFID tag is integrated with a processor of the electronic product. The RFID tag can receive an enable mark only when the electronic product is checked out via a POS. Only when the processor receives the enable mark from the RFID tag can the start-up sequence of the electronic product be executed completely. The present invention can thus lower the motives for thievery. In data transmission applications, the RFID tag is integrated with a sensor of the electronic product. Data measured by the sensor can be stored in the memory of the RFID tag and outputted via the RFID tag. The present invention can thus transmit data more efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having a radio frequency identification (RFID) tag comprising:
    an RFID tag circuit including:
        an input/output (I/O) interface;
        a memory for storing data;
        a first path-controlling circuit for receiving a first signal via the I/O interface, receiving a second signal in a wireless manner, and outputting one of the first and second signals;
        a baseband circuit coupled to the first path-controlling circuit and the memory for processing signals outputted by the first path-controlling circuit, accessing data stored in the memory, and outputting an output signal; and
        a second path-controlling circuit coupled to the baseband circuit for outputting signals outputted by the baseband circuit via the I/O interface or in a wireless manner; and
    an integrated circuit coupled to the I/O interface for transmitting signals with the RFID tag circuit.

2. The electronic device of claim 1 wherein the integrated circuit is capable of accessing the data stored in the memory.

3. The electronic device of claim 1 wherein the integrated circuit is capable of outputting a control signal to the RFID tag circuit for controlling the first path-controlling circuit.

4. The electronic device of claim 1 wherein the integrated circuit is capable of providing power for operating the RFID tag circuit.

5. The electronic device of claim 1 wherein the integrated circuit transmits signals to the RFID tag circuit based on a protocol of the RFID tag circuit.

6. The electronic device of claim 1 wherein the RFID tag circuit further comprises:
    an antenna for receiving a radio frequency (RF) signal in a wireless manner;
    a rectifier for transforming the RF signal into a direct current (DC) signal; and
    a power management module coupled to the rectifier for generating power for operating the RFID tag circuit based on the DC signal.

7. The electronic device of claim 6 wherein the RFID tag circuit further comprises a detecting circuit coupled between the I/O interface and the power management module for controlling a path through which the first signal is transmitted to the power management module.

8. The electronic device of claim 7 wherein the detecting circuit includes a diode and a resistor.

9. The electronic device of claim 1 wherein the RFID tag circuit further comprises a demodulator for demodulating the second signal.

10. The electronic device of claim 1 wherein the RFID tag circuit further comprises:
  a modulator coupled to the second path-controlling circuit for modulating the output signal of the baseband circuit; and
  an antenna for outputting the modulated output signal of the baseband circuit.

11. The electronic device of claim 1 wherein the RFID tag circuit further comprises an oscillator coupled to the baseband circuit for generating clock signals for operating the baseband circuit.

12. The electronic device of claim 1 wherein the first path-controlling circuit is a multiplexer and the second path-controlling circuit is a demultiplexer.

13. The electronic device of claim 1 wherein the RFID tag circuit further comprises a filter coupled between the I/O interface and the first path-controlling circuit.

14. The electronic device of claim 1 wherein the RFID tag circuit further comprises a battery for providing power for operating the RFID tag circuit.

15. An RFID tag comprising:
  an I/O interface;
  a memory for storing data;
  a first path-controlling circuit for receiving a first signal via the I/O interface, receiving a second signal in a wireless manner, and outputting one of the first and second signals;
  a baseband circuit coupled to the first path-controlling circuit and the memory for processing signals outputted by the first path-controlling circuit, accessing data stored in the memory, and outputting an output signal;
  a second path-controlling circuit coupled to the baseband circuit for outputting signals outputted by the baseband circuit via the I/O interface or in a wireless manner;
  an antenna for receiving an RF signal in a wireless manner;
  a rectifier for transforming the RF signal into a DC signal;
  a power management module coupled to the rectifier for generating power for operating the RFID tag based on the DC signal; and
  a detecting circuit coupled between the I/O interface and the power management module for controlling a path through which the first signal is transmitted to the power management module.

16. The RFID tag of claim 15 wherein the detecting circuit includes a diode and a resistor.

17. The RFID tag of claim 15 further comprising a battery for providing power.

18. The RFID tag of claim 15 further comprising:
  a demodulator generating the second signal by demodulating the RF signal.

* * * * *